US007853223B2

United States Patent
Han et al.

(10) Patent No.: US 7,853,223 B2
(45) Date of Patent: Dec. 14, 2010

(54) SELF-BIASED RECEIVER SYSTEM USING A MULTI-FED ANTENNA

(75) Inventors: Sang-min Han, Hwaseong-si (KR);
Ji-yong Park, Los Angeles, CA (US);
Tatsuo Itoh, Los Angeles, CA (US)

(73) Assignees: Samsung Electronics Co., Ltd.,
Suwon-si (KR); The Regents of the University of California, Oakland, CA (US)

( * ) Notice: Subject to any disclaimer, the term of this patent is extended or adjusted under 35 U.S.C. 154(b) by 784 days.

(21) Appl. No.: 11/442,267

(22) Filed: May 30, 2006

(65) Prior Publication Data

US 2007/0090999 A1 Apr. 26, 2007

Related U.S. Application Data

(60) Provisional application No. 60/729,217, filed on Oct. 24, 2005.

(51) Int. Cl.
*H04B 1/06* (2006.01)
*H04B 7/00* (2006.01)
*H04M 1/00* (2006.01)

(52) U.S. Cl. .................. 455/130; 455/269; 455/575.7; 343/402

(58) Field of Classification Search ........ 455/13.3–13.4, 455/25, 63.4, 82, 526.1, 575.7, 121.1–123, 455/129, 193.1–193.3, 269–282; 343/702, 343/703

See application file for complete search history.

(56) References Cited

U.S. PATENT DOCUMENTS

| | | | |
|---|---|---|---|
| 6,480,699 B1 * | 11/2002 | Lovoi | 455/41.2 |
| 6,597,930 B2 * | 7/2003 | Nakamura et al. | 455/575.1 |
| 6,882,128 B1 * | 4/2005 | Rahmel et al. | 320/101 |
| 7,280,077 B2 * | 10/2007 | Woo et al. | 343/703 |
| 2007/0281657 A1 * | 12/2007 | Brommer et al. | 455/334 |
| 2009/0098915 A1 * | 4/2009 | Mickle et al. | 455/573 |

* cited by examiner

*Primary Examiner*—Simon D Nguyen
(74) *Attorney, Agent, or Firm*—Sughrue Mion, PLLC

(57) ABSTRACT

Provided a self-biased receiver system using a multi-fed antenna, including: at least one first port connected to an electronic circuit; and a second port connected to a feeder forming a DC (direct current) voltage using an input electromagnetic wave and feeding the DC voltage to the electronic circuit.

9 Claims, 5 Drawing Sheets

SELF-BIASED RECEIVER SYSTEM USING A MULTI-FED ANTENNA

CROSS-REFERENCE TO RELATED APPLICATIONS

This application claims the priority from U.S. Provisional Application No. 60/729,217 filed on Oct. 24, 2005 in the United States Property Trademark Office, the disclosure of which is incorporated herein by reference.

BACKGROUND OF THE INVENTION

1. Field of the Invention

The present invention relates to a self-biased receiver system using a multi-fed antenna, and more particularly, to a self-biased receiver system using a multi-fed antenna adopted in a small-sized device so as to make the small-sized device compact and light.

2. Description of the Related Art

A rectenna is a word formed of a synthesis of a rectifier and an antenna, i.e., an element mixing a rectifier and an antenna to directly convert an electromagnetic wave into a direct current (DC) power.

The rectenna has a structure in which a rectifier diode is connected to a central part of a dipole antenna and an electromagnetic wave input through the dipole antenna electrically resonates in the rectifier diode as a non-linear element to form harmonic component.

Such a rectenna will be used in a system transmitting a power generated in the space to the earth. A huge solar battery panel is installed in a stationary satellite floating in the space to generate a power, the power is converted into an electromagnetic wave, and the electromagnetic wave is transmitted from an antenna of the stationary satellite to a rectenna array on the earth. The rectenna array converts the electromagnetic wave into a DC power. If a power is generated in the space as described above, the power is not affected by the weather and gravity unlike on the earth. Thus, a high power may be stably generated.

Attentions were focused on only the developments of receiving of a high power and an effective conversion of the high power using a rectenna. Also, such a system requires a large-sized rectenna array to transmit the high power.

However, if such rectenna technology is used in compact devices, the rectenna technology may be put to practical use and be general-purpose. For example, batteries have been removed from devices with the tendency to make devices compact. Also, rectennas may be used to supply a power so as to remove batteries from devices. Thus, the devices may be made compact and light.

Also, antennas having a structure in which rectennas are installed in the devices are required to adopt the rectennas.

SUMMARY OF THE INVENTION

Accordingly, the present general inventive concept has been made to solve the above-mentioned and/or problems, and an aspect of the present general inventive concept is to provide a self-biased receiver system using a multi-fed antenna adopted to making a device compact and light.

According to an aspect of the present invention, there is provided a receiver system including: at least one first port connected to an electronic circuit; and a second port connected to a feeder forming a DC (direct current) voltage using an input electromagnetic wave and feeding the DC voltage to the electronic circuit.

The electronic circuit may be a transmitter circuit, a receiver circuit, an active circuit, or a passive circuit.

The feeder may be a rectenna.

The rectenna may include: a diode generating harmonic frequency components of the electromagnetic wave; and a filter filtering a signal generated by the diode to output a DC voltage.

The receiver system may further include a radiator sheet radiating the electromagnetic wave. The first port may be disposed on an identical plane to the radiator sheet, and the second port may be disposed perpendicular to the radiator sheet.

The radiator sheet may be formed in a disc shape and comprise a side cut in a fan shape at a predetermined angle.

Outputs of the harmonic frequencies generated by the diode may be intercepted.

A charging element charging a DC power output from the rectenna may be installed at an output node of the rectenna.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF EXEMPLARY EMBODIMENTS

Figure 1:
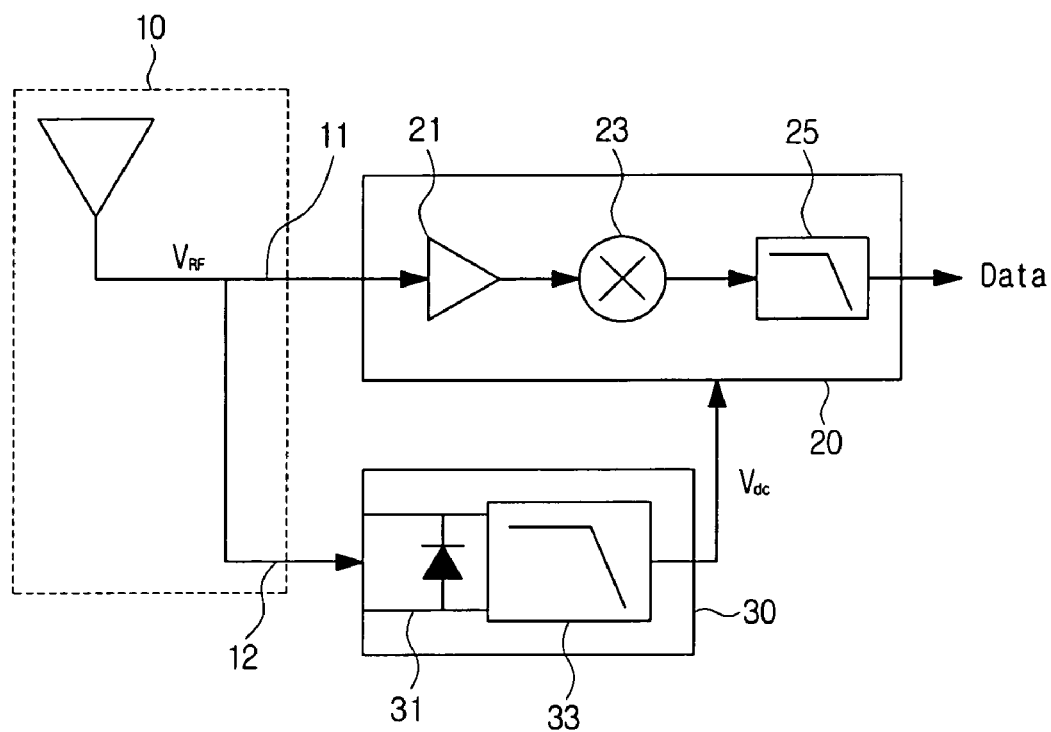
FIG. 1 is a circuit diagram of a receiver system including a multi-fed antenna according to the present invention.

Exemplary embodiments of the present invention will be described in detail with reference to the annexed drawings. In the drawings, the same elements are denoted by the same reference numerals throughout the drawings. In the following description, detailed descriptions of known functions and configurations incorporated herein have been omitted for conciseness and clarity.

A multi-fed antenna according to the present invention may be used in electronic circuits of various types of devices to supply a DC power. The electronic circuits may be transmitter circuits, receiver circuits, active circuits, passive circuits, or the like, and the multi-fed antenna will be installed in a receiver in an embodiment that will be described later.

Figure 2:
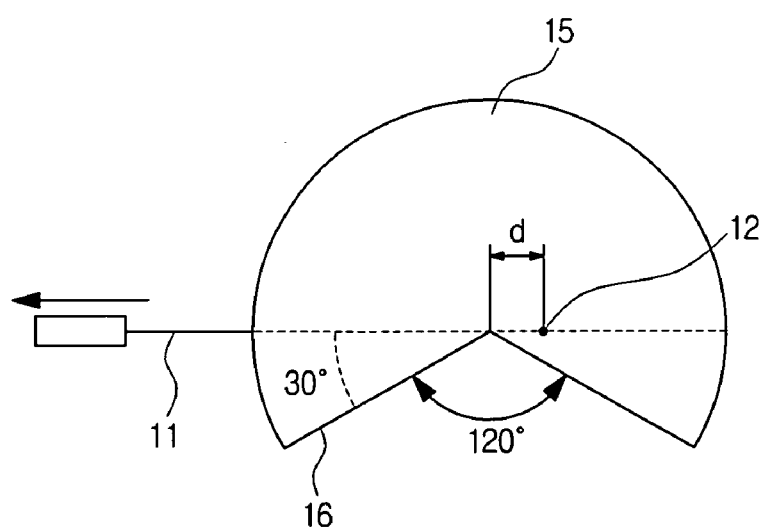
FIG. 2 is a plan view of the multi-fed antenna shown in FIG. 1.

FIG. 1 is a circuit diagram of a receiver including a multi-fed antenna according to the present invention, and FIG. 2 is a plan view of the multi-fed antenna shown in FIG. 1.

Referring to FIGS. 1 and 2, the receiver includes a multi-fed antenna 10 having first and second ports 11 and 12 as a plurality of feeding ports, a receiver circuit 20 connected to the first port 11 of the multi-fed antenna 10, and a rectenna 30 connected to the second port 12 of the multi-fed antenna 10.

As shown in FIG. 2, the multi-fed antenna 10 includes a radiator sheet 15 connected to the first port 11 connected to the receiver circuit 20 and the second port 12 connected to the rectenna 30.

The radiator sheet 15 is formed in a disc shape, and a cut part 16 cut at a predetermined angle in a fan shape with respect to a center point is formed at one side of the radiator sheet 15. The cut part 16 must be formed at an angle of 120°.

The first port 11 is disposed so as to extend along the same plane as the radiator sheet 15 and form a predetermined angle with the cut part 16 of the radiator sheet 15. The first port 11 is disposed at a distance of an angle of 30° from the cut part 16 as shown in FIG. 2.

The second port 12 is disposed perpendicular to a surface of the radiator sheet 15 at a predetermined distance from the center point of the radiator sheet 15. Here, an end of the second port 12 contacts an end of the first port 11 advancing toward the radiator sheet 15 so that the second port 12 is perpendicular to the first port 11.

Figure 3A:
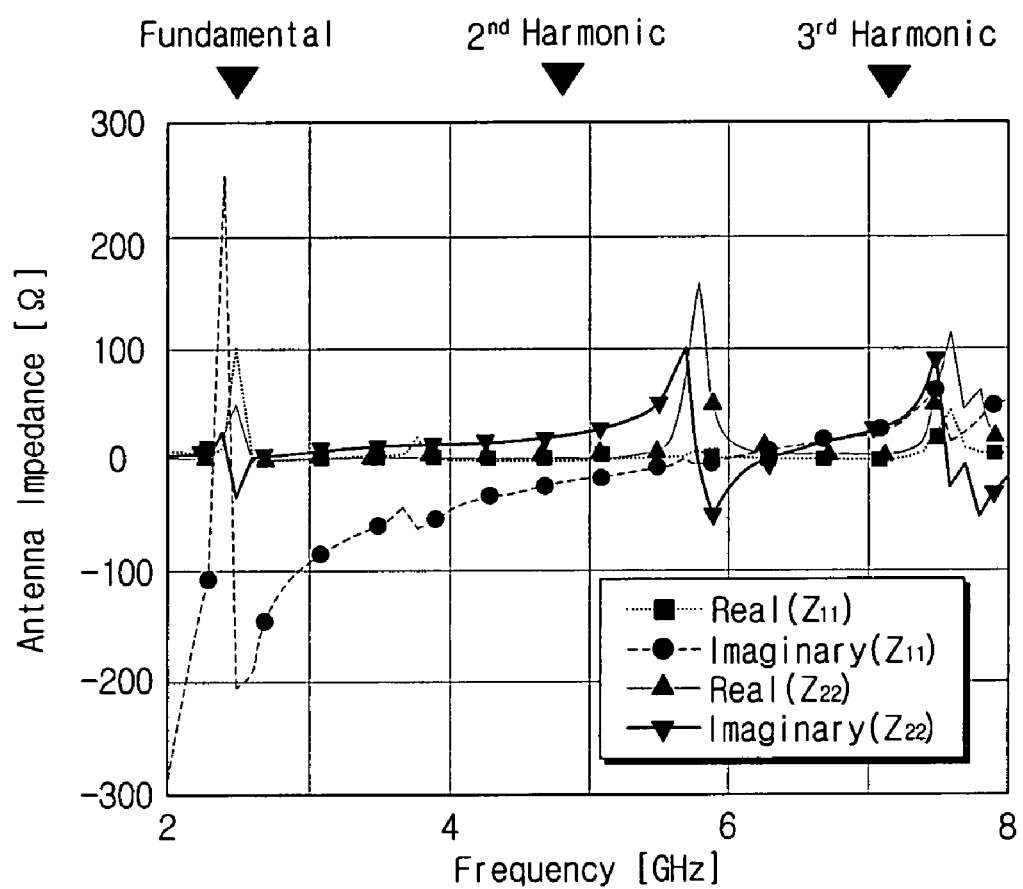
FIG. 3A is a graph illustrating an impedance characteristic of the multi-fed antenna shown in FIG. 2.
Figure 3B:
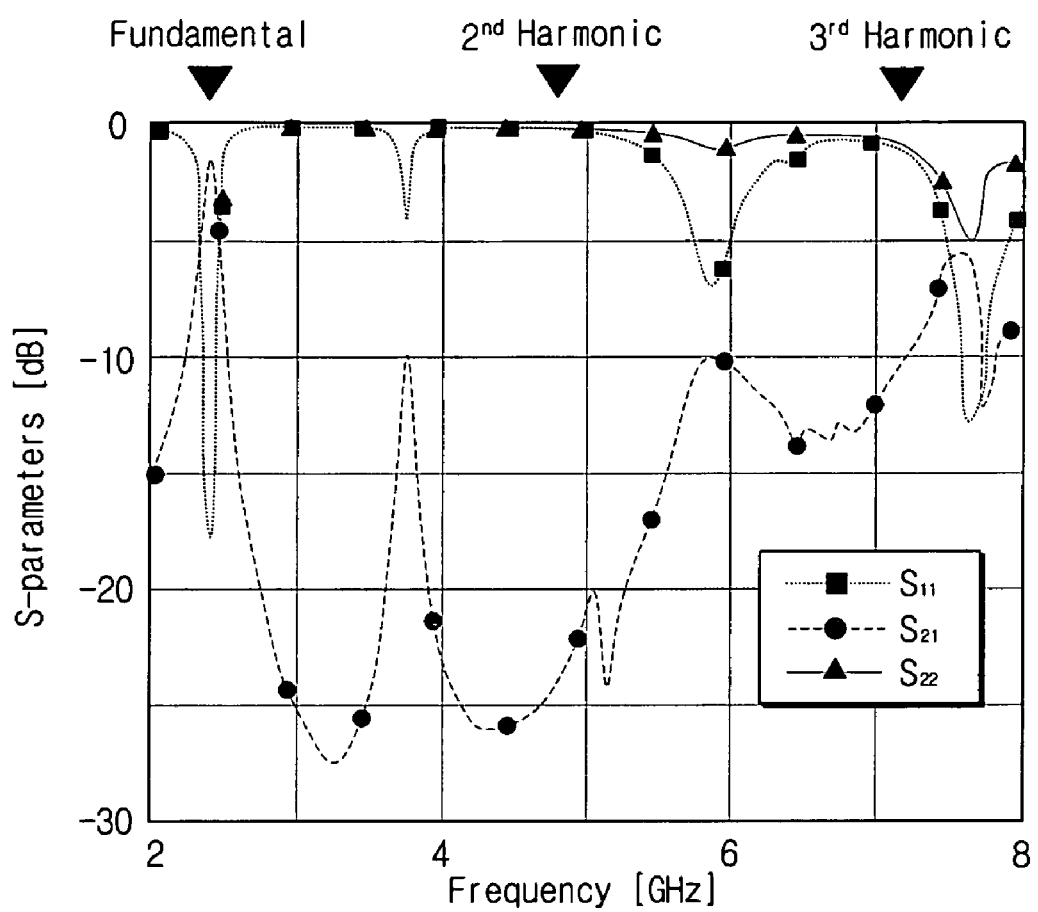
FIG. 3B is a graph illustrating S-parameters of the multi-fed antenna shown in FIG. 2.

FIG. 3A is a graph illustrating an impedance characteristic of the multi-fed antenna 10 shown in FIG. 2, and FIG. 3B is a graph illustrating S-parameters of the multi-fed antenna 10 shown in FIG. 2.

The graphs shown in FIGS. 3A and 3B illustrate the results of an experiment performed with respect to the multi-fed antenna 10 adoptable in a local area communication system using a radio frequency identification (RFID) system and an RFID tag.

An impedance characteristic of the multi-fed antenna 10 will now be described. As shown in FIG. 3A, a resonance is generated in a frequency of 2.4 GHz, but an electric field radiation is not generated in a higher harmonic frequency.

S-parameters shown in FIG. 3B will now be described. A resonance is formed in a frequency of 2.4 GHz but not formed in second and third harmonic frequencies of 4.8 GHz and 7.2 GHz. In other words, transmission and reception of a signal through the multi-fed antenna 10 is intercepted in the second and third harmonic frequencies. Here, bandwidths of reference frequencies of the first and second ports 11 and 12 are 27 MHz and 36 MHz, respectively, and return losses are 12.9 dB and 18.9 dB, respectively.

According to the impedance characteristic and the S-parameters, the multi-fed antenna 10 transmits and receives only a signal having a reference frequency of 2.4 GH, and a signal is not radiated through the multi-fed antenna 10 in harmonic frequencies of 4.8 GHz and 7.2 GHz of a reference frequency. Thus, the multi-fed antenna 10 may transmit and receive a signal in a specific frequency band without installing an additional filter, i.e., a band pass filter (BPF).

The rectenna 30 connected to the second port 12 of the multi-fed antenna 10 includes a diode 31 and a low pass filter (LPF) 33.

Here, the diode 31 as a non-linear element rectifies a signal input through the multi-fed antenna 10 and generates harmonic frequency components. In other words, in a case of an RFID, a reference frequency is 2.4 GHz. Thus, the diode 31 generates frequencies of 0 GHz (direct current (DC) signal), 4.8 GHz, 7.2 GHz . . . that are harmonic frequency components of 2.4 GHz and converge the frequencies to the DC signal due to a resonance.

The LPF 33 of the rectenna 30 receives signals from the diode 31 and filters only a DC signal of the signals to supply a DC voltage to a low noise amplifier (LNA) 21 of the receiver circuit 20. Since the multi-fed antenna 10 operates as a BPF, the harmonic frequency components generated by the diode 31 are not radiated to the outside through the multi-fed antenna 10. Also, since the LPF 33 of the rectenna 30 outputs only the DC signal, the harmonic frequencies of 4.8 GHz and 7.2 GHz continuously resonate in the diode 31 and thus converge to the DC signal, and harmonic frequency components are continuously generated from signals input through the multi-fed antenna 10. As a result, efficiency of the diode 31 may be improved, and a whole system can be realized at a low power.

Although not shown, a charging element may be installed between the LPF 33 of the rectenna 30 and the receiver circuit 20. In this case, a DC voltage is charged in the charging element to supply the DC voltage to the receiver circuit 20 at a desired period.

The receiver circuit 20 connected to the first port 11 of the multi-fed antenna 10 includes the LNA 21, a self-mixer 23, and a LPF 25.

The LNA 21 amplifies a signal input through the multi-fed antenna 10 and is supplied with a DC voltage from the rectenna 30 so as to operate.

The self-mixer 23 downs the signal amplified by the LNA 21 to a base band and does not use an existing local oscillator. An existing mixer using a local oscillator includes an input node, an output node, and an oscillator connection node, while the self-mixer 23 includes only an input node and an output node. The self-mixer 23 receives a carrier and a data signal through the multi-fed antenna 10 and downs the data signal to a base band using the carrier.

If a signal is received in the form of Large Carrier-Double SideBand (LC-DSB), the self-mixer 23 may be adopted. When a LC-DSB signal having a frequency band of 2.4 GHz is received and downconverted, a relative low loss of 4.5 dB occurs. Since the self-mixer 23 does not require the local oscillator, power consumption can be reduced.

The LPF 25 filters a downconverted data signal to extract only a signal in a desired band.

Figure 4:
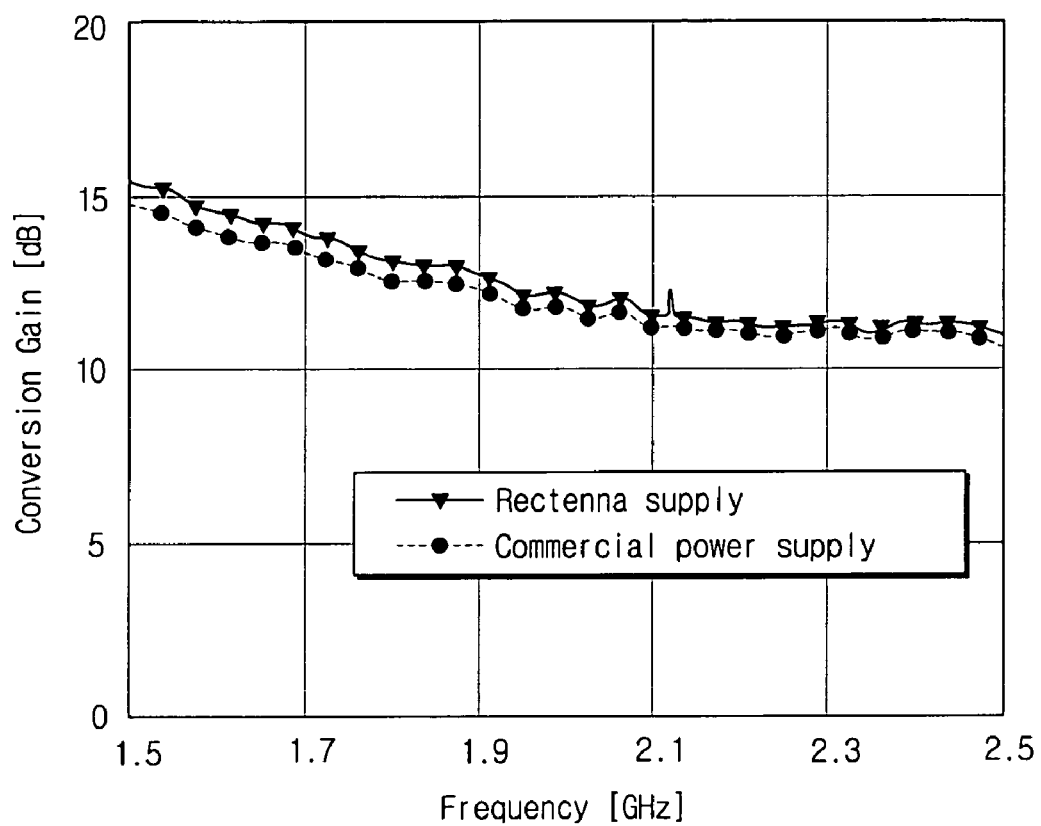
FIG. 4 is a graph illustrating a conversion gain of the LNA at receiver shown in FIG. 1.

FIG. 4 is a graph illustrating a conversion gain of the LNA at receiver shown in FIG. 1.

A gain of the LNA 21 supplied with the DC voltage from the rectenna 30 was measured to observe a performance of the rectenna 30 installed in the multi-fed antenna 10. Here, after a DC voltage biased by the rectenna 30 and a DC voltage supplied from a general commercial power supply are supplied to the LNA 21, conversion gains of the LNA 21 were compared. As shown in FIG. 4, the performance of the LNA 21 when being supplied with the DC voltage through the rectenna 30 is almost similar to when being supplied with the DC voltage using the commercial power supply. Here, a difference occurs during the two-time measurements due to a difference between a load of the rectenna 30 and a load of the power supply and a variation in a power of a signal received from the rectenna 30.

According to the results of this experiment, the rectenna 30 supplies a sufficient DC voltage to the receiver circuit 20. Thus, the rectenna 30 may be put to practical use.

Figure 5A:
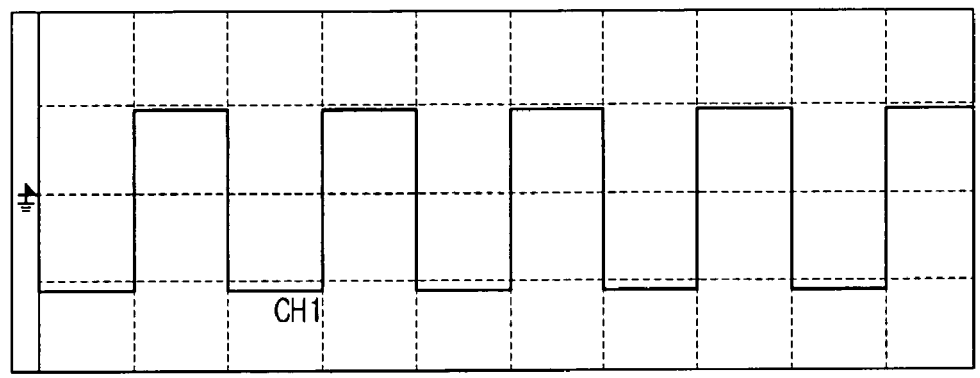
FIG. 5A is a view illustrating a waveform of a signal transmitted from a transmitter.
Figure 5B:
FIG. 5B is a view illustrating a waveform of the signal of FIG. 5A processed by and output from the receiver system including the multi-fed antenna shown in FIG. 1.

FIG. 5A is a view illustrating a waveform of a signal transmitted from a transmitter, and FIG. 5B is a view illustrating a waveform of the signal of FIG. 5A processed by and output from the receiver including the multi-fed antenna shown in FIG. 1.

If the LNA 21 is supplied with the DC voltage from the rectenna 30 to operate, the carrier and the data signal are amplified, and the amplified data signal is downconverted by the self-mixer 23. Thus, comparing a signal output from the receiver with a signal transmitted from the transmitter, the two signals hardly have a difference and are well recovered as shown in FIGS. 5A and 5B.

The multi-fed antenna 10 having the above-described structure can removes a BPF to reduce a number of components. Thus, hardware size of the receiver including the multi-fed antenna 10 can be reduced. Also, the multi-fed antenna 10 allows the DC voltage consumed by the LNA 21 to be supplied to the rectenna 30 and uses the self-mixer 23 so as to reduce consumed power.

Harmonic frequencies continuously resonate in the diode 31 by the multi-fed antenna 10 and the LPF 33 of the rectenna 30 so as to improve efficiency of a whole system.

Since a power is supplied using the rectenna 30, a battery can be removed. Thus, the whole system can be compact and light.

As described above, according to the present invention, a multi-fed antenna enabling an installation of a rectenna can be used to make a device compact and light, reduce consumed power, and improve efficiency of a whole system.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A receiver system comprising:
   an antenna, comprising at least one of:
   a first port connected to an electronic circuit;
   a second port connected to a feeder forming a DC (direct current) voltage using an input electromagnetic wave received by the antenna and feeding the DC voltage to the electronic circuit; and
   a radiator sheet radiating the electromagnetic wave,
   wherein the first port is disposed on an identical plane to the radiator sheet.

2. The receiver system of claim 1, wherein the electronic circuit is at least one of a transmitter circuit, a receiver circuit, an active circuit, and a passive circuit.

3. The receiver system of claim 1, wherein the feeder is a rectenna.

4. The receiver system of claim 3, wherein the rectenna comprises:
   a diode generating harmonic frequency components of the electromagnetic wave; and
   a filter filtering a signal generated by the diode to output a DC voltage.

5. The receiver system of claim 3, wherein a charging element charging a DC power output from the rectenna is installed at an output node of the rectenna.

6. The receiver system of claim 1, wherein the second port is disposed perpendicular to the radiator sheet.

7. The receiver system of claim 6, wherein the radiator sheet is formed in a disc shape and comprise a side cut in a fan shape at a predetermined angle.

8. The receiver system of claim 7, wherein outputs of the harmonic frequencies generated by the diode are intercepted.

9. The receiver of claim 1, wherein the first port is disposed at a distance of an angle of 30° from a cut part of the antenna.

\* \* \* \* \*